Sept. 17, 1968 J. G. GAMBLE Re. 26,456

ELECTRONIC GAS ANALYZER USING PARAMAGNETIC PROPERTIES OF THE GAS TO CONTROL ELECTRON FLOW

Original Filed Feb. 9, 1961

INVENTOR
JOHN G. GAMBLE

BY

Nolte & Nolte
ATTORNEYS

United States Patent Office

Re. 26,456
Reissued Sept. 17, 1968

26,456

ELECTRONIC GAS ANALYZER USING PARAMAGNETIC PROPERTIES OF THE GAS TO CONTROL ELECTRON FLOW

John G. Gamble, Killingworth, Conn., assignor, by direct and mesne assignments, of thirty-three and one-third percent to Elton Industries, Inc., New York, N.Y., a corporation of New York

Original No. 3,234,456, dated Feb. 8, 1966, Ser. No. 88,196, Feb. 9, 1961. Application for reissue Oct. 12, 1966, Ser. No. 595,547

9 Claims. (Cl. 324—36)

Matter enclosed in heavy brackets [ ] appears in the original patent but forms no part of this reissue specification; matter printed in italics indicates the additions made by reissue.

*ABSTRACT OF THE DISCLOSURE*

*An electron beam tube has a hollow toroidal control grid chamber about the tube between the electron gun and the anode of the tube. The grid chamber includes a passageway for the flow of paramagnetic fluids therethrough. A toroidal field winding about the chamber creates an electromotive force acting along the axis of electron flow within the tube in proportion to the partial pressure of the paramagnetic fluids in the passageway to thereby vary the electron flow proportional to the partial pressure.*

The present invention relates to electron tubes in general, and in particular to tubes having a magnetic grid winding employing a hollow toroid as a core to establish a field in proportion to the partial pressure of a paramagnetic gas, such as oxygen, passing through said toroidal core.

While it is known in the prior art to use the paramagnetic property of oxygen to provide a measurement of the partial pressure of oxygen in a gas mixture, the devices employing such principles were complex in nature, relatively fragile and affected by vibration, usually employed heavy magnets and had inaccuracies introduced by friction in the mechanism. Applicant's novel oxygen sensing cell, on the other hand, is not subject to these prior art deficiencies and employs the paramagnetic properties of oxygen to vary the effective magnetic field of a toroidal winding placed about a beam of electron flow to effect acceleration or retardation of the electrons in their movement to the anode of the tube.

The invention may employ a second toroidal magnetic grid winding spaced about the beam of electron flow to create a grid potential in opposite phase to the first toroid at zero oxygen, to provide a net or difference signal between the magnetic grids in proportion to the partial pressure of oxygen in the first toroid core.

An object therefore, of the invention is to provide an oxygen sensing electron tube which is not subject to the deficiencies of the prior art.

A further object of the invention is to provide a paramagnetic gas sensing device which is accurate and reliable, light in weight, rugged in construction, and which will provide a continuous indication of the partial pressure of the paramagnetic gas being measured.

A further object of the invention is to provide an electron tube employing a variable magnetic grid in the form of a toroidal winding about a circular gas passageway.

Figure 1:
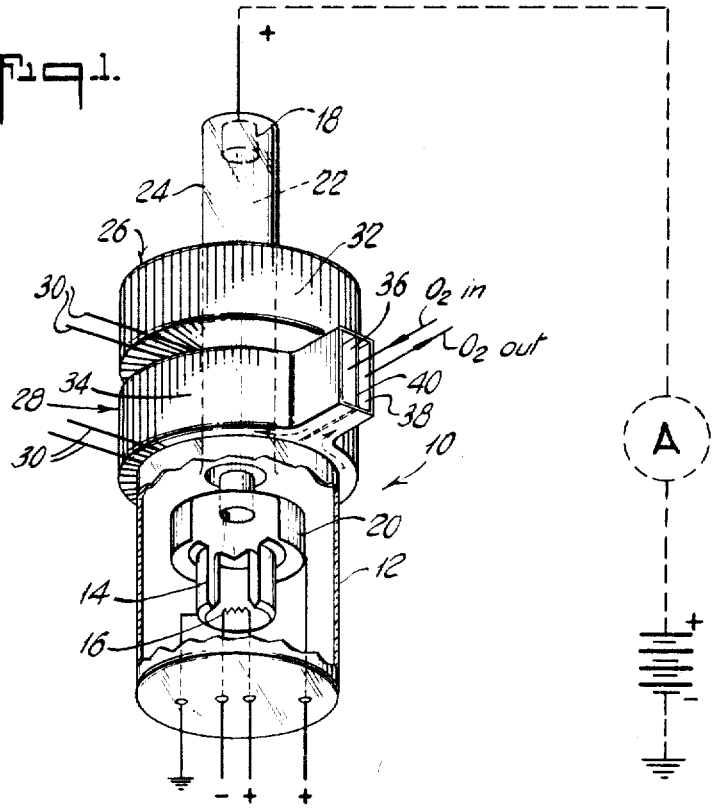
Figure 2:
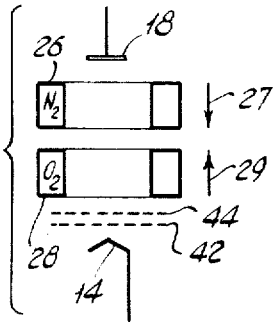

Other objects and advantages of the invention will become apparent and the invention will be fully understood from the following description of the drawings in which:

FIG. 1 is a perspective view of the invention with portions broken away to show the various elements; and FIG. 2 is a somewhat schematic view of the invention showing the function of the various elements.

Referring to the drawing, a magnetic grid electron tube 10 includes a sealed envelope portion 12 containing the usual cathode 14, filament 16, anode 18, and a focusing or gun anode 20. Suitable voltages are applied to the respective terminals in well-known fashion to create an electron beam flow 22 from the cathode 14 to the anode 18 inside the elongated tubular portion 24 of the envelope 12.

Spaced about the tubular portion 24 is a hollow sealed standard toroidal grid element shown generally at 26, having a toroidal winding 30 wound thereon. The toroidal grid 26 includes a circular chamber portion 32 which may be filled with any diamagnetic gas, such as nitrogen. Adjacent the standard toroidal chamber 26 is a similarly sized variable magnetic grid toroid 28 having a similar winding 30 thereabout. The toroid 28 is formed to provide a measurement chamber 34 therein having an inlet opening 36 and a discharge opening 38 defined by a partition wall 40, which extends radially inward to define a circular passageway for the sample gas to be measured.

Referring to FIG. 2, which shows the general elements of FIG. 1 in schematic cross-section, an electromotive force vector 27 designates the direction of force generated by the winding 30 about the toroid 26 containing nitrogen. The electromotive force vector 29 is shown of an equal and opposite strength and is generated by a suitably phased similar signal in winding 30 spaced about the measurement chamber 28. It should be appreciated the vectors 27 and 29 will only be of equal magnitude and opposite direction when the signals applied to the windings 30 are of equal magnitude and the chamber 28 does not contain any partial pressure of oxygen. In operation, as the partial pressure of oxygen increases from zero to a perceptible value, the vector 29 will increase in magnitude and thereby effect an acceleration of electron flow from the cathode to the anode of the tube, thereby providing a signal at the anode 18 in proportion to the partial pressure of oxygen flowing in the circular passageway 34.

Obviously, while in the embodiment shown, a pair of toroidal windings 26 and 28 have been provided to create a net or difference signal, a single magnetic grid, such as 28, is all that is required for an amplifier tube, such as shown in FIG. 2. The tube of FIG. 2 is also provided with a signal grid 42 and a conventional acceleration grid 44 to enhance electron flow therein and to establish the desired character of the resultant electron stream.

Those skilled in the art will readily appreciate how the novel sensing cell of the invention may be incorporated into a measurement system employing the usual electronic power supplies, signal generators, etc., to provide an indication upon a D.C. voltmeter or the like, equivalent to the percentage of paramagnetic gas flowing through the circular passageway 34 in the measurement toroid 28. Those skilled in the art, will also readily appreciate that an oxygen measuring system employing two such tubes in parallel may be embodied wherein said toroidal windings 30 on one of the tubes establish an opposite direction field so that a differential signal of increased sensitivity is obtained between the outputs of the respective anodes of the tubes to create a higher overall measurement sensitivity.

While the specific embodiment of the invention has been shown and described in detail to illustrate the application of the invention principles, it will be understood that the invention may be embodied otherwise without departing from such principles.

I claim:

1. In an electron beam tube having an electron gun and an anode, the improvement comprising, a hollow toroidal control grid chamber about said tube between said gun and said anode, said grid chamber including a passageway for the flow of paramagnetic fluids therethrough, and a toroidal field winding about said chamber for creating an electromotive force acting along the axis of electron flow within said tube in proportion to the partial pressure of the paramagnetic fluids in said passageway to thereby vary the electron flow proportional to the said partial pressure.

2. An electron beam tube according to claim 1 including a sealed toroidal chamber adjacent said control grid chamber, said sealed chamber including a toroidal winding thereabout wound in phase opposition to the winding on said control grid chamber, said sealed chamber being filled with a substance having predetermined magnetic properties.

3. An electron beam tube according to claim 1 wherein said hollow grid chamber comprises wall means defining a toroid-like chamber having an inlet port through a wall thereof, an outlet port adjacent said inlet port, and a partition wall between said parts dividing said chamber into a curved extended passageway.

4. Apparatus for sensing the partial pressure of a paramagnetic fluid, comprising an electron beam tube including an electron gun and an anode, a hollow toroidal grid chamber about said tube intermediate said gun and said anode, said grid chamber including a passageway for the flow of paramagnetic fluids therethrough, a toroidal field winding about said chamber for creating an electromotive force along the axis of electron flow within said tube in proportion to the partial pressure of the paramagnetic fluids in said passageway to thereby vary the electron flow proportional to said partial pressure and indicator means connected to said anode for measuring the electron flow responsive to said partial pressure.

*5. Apparatus comprising means for directing a stream of electrons along an axis; a field winding having a hollow core element adapted for receiving paramagnetic fluids therein, and being in operative proximity with said stream of electrons for creating an electromotive force along the axis of said stream of electrons in proportion to the partial pressure of the paramagnetic fluids in said hollow core element to thereby vary the flow of electrons in said stream of electrons proportional to said partial pressure and indicator means responsive to variations in the flow of electrons.*

*6. Apparatus as claimed in claim 5, wherein said field winding is of toroidal configuration and said hollow core element is a passageway of toroidal configuration.*

*7. Apparatus comprising means for directing a stream of electrons along an axis; a passageway for the flow of paramagnetic fluids therethrough; and a field winding wound around said passageway in operative proximity with said stream of electrons for creating an electromotive force along the axis of said stream of electrons passing through the axis of said passageway in proportion to the partial pressure of the paramagnetic fluids in said passageway to thereby vary the flow of electrons in said stream of electrons proportional to said partial pressure.*

*8. Apparatus comprising means for directing a stream of electrons along an axis; a toroidal passageway for the flow of paramagnetic fluids therethrough; and a toroidal field winding wound around said passageway in operative proximity with said stream of electrons for creating an electromotive force along the axis of said stream of electrons passing through the axis of said passageway in proportion to the partial pressure of the paramagnetic fluids in said passageway to thereby vary the flow of electrons in said stream of electrons proportional to said partial pressure.*

*9. Apparatus as claimed in claim 8, further comprisin said stream of electrons proportional to said partial the flow of diamagnetic fluids therethrough and a toroidal field winding wound around said second passageway and wherein said stream of electrons passes through the axis of said second passageway.*

References Cited

The following references, cited by the Examiner, are of record in the patented file of this patent or the original patent.

UNITED STATES PATENTS

| | | | |
|---|---|---|---|
| 1,645,057 | 10/1927 | Junken | 324—44 X |
| 1,680,783 | 8/1928 | Gutzmann | 336—229 |
| 2,182,736 | 12/1939 | Penning | 324—44 X |
| 2,542,057 | 2/1951 | Relis | 324—40 X |
| 2,696,731 | 12/1954 | Luft | 324—36 |
| 2,779,917 | 1/1957 | De Boisblanc | 324—40 X |
| 3,008,044 | 11/1961 | Buchhold | 313—22 |
| 3,049,665 | 8/1962 | Hummel | 324—36 |
| 3,078,412 | 2/1963 | Blake | 324—30 |

RUDOLPH V. ROLINEC, *Primary Examiner.*

R. J. CORCORAN, *Assistant Examiner.*